(12) United States Patent
Urata et al.

(10) Patent No.: US 11,731,899 B2
(45) Date of Patent: Aug. 22, 2023

(54) METHOD FOR PRODUCING VEHICULAR STRUCTURE AND METHOD FOR PRODUCING PROTECTIVE FILM-ATTACHED TRANSPARENT SUBSTRATE

(71) Applicant: AGC Inc., Tokyo (JP)

(72) Inventors: Ryouichi Urata, Tokyo (JP); Masayuki Sase, Tokyo (JP)

(73) Assignee: AGC INC., Tokyo (JP)

( * ) Notice: Subject to any disclaimer, the term of this patent is extended or adjusted under 35 U.S.C. 154(b) by 647 days.

(21) Appl. No.: 16/749,783

(22) Filed: Jan. 22, 2020

(65) Prior Publication Data

US 2020/0239358 A1 Jul. 30, 2020

(30) Foreign Application Priority Data

Jan. 25, 2019 (JP) ................. 2019-011231

(51) Int. Cl.
| | | |
|---|---|---|
| *C03C 17/00* | (2006.01) | |
| *B05D 3/00* | (2006.01) | |
| *B60J 1/20* | (2006.01) | |

(52) U.S. Cl.
CPC ............ *C03C 17/001* (2013.01); *B05D 3/002* (2013.01); *B60J 1/2094* (2013.01); *B05D 2203/35* (2013.01)

(58) Field of Classification Search
None
See application file for complete search history.

(56) References Cited

U.S. PATENT DOCUMENTS

| | | | | |
|---|---|---|---|---|
| 5,028,287 A | * | 7/1991 | Herliczek | ......... B32B 17/10761 |
| | | | | 156/289 |
| 6,328,368 B1 | | 12/2001 | Liu et al. | |
| 2002/0014778 A1 | | 2/2002 | Campfield et al. | |
| 2009/0123640 A1 | | 5/2009 | Suzuki | |
| 2013/0309476 A1 | | 11/2013 | Ikenaga et al. | |
| 2020/0055280 A1 | * | 2/2020 | Shirasuna | ............... B32B 27/32 |

FOREIGN PATENT DOCUMENTS

| | | |
|---|---|---|
| CH | 676829 A5 | 3/1991 |
| EP | 1 793 993 A1 | 6/2007 |
| JP | 3596901 B2 | 12/2004 |
| JP | 2006-192392 A | 7/2006 |
| JP | 2010-121044 A | 6/2010 |
| JP | 2012-158153 A | 8/2012 |
| JP | 2017-109447 A | 6/2017 |
| WO | WO-85/05073 A1 | 11/1985 |
| WO | WO-2006/036605 A1 | 4/2006 |
| WO | WO-2018/092779 A1 | 5/2018 |

\* cited by examiner

*Primary Examiner* — Michael P. Rodriguez
(74) *Attorney, Agent, or Firm* — Foley & Lardner LLP

(57) ABSTRACT

A method for producing a vehicular structure in which a transparent substrate and an adherend are bonded together by an adhesive includes pasting a protective film on, so as to cover, an adhesive arrangement area in a peripheral part of a vehicle-inner-side surface of the transparent substrate, and arranging an adhesive in the adhesive arrangement area after removing the protective film, and bonding together the transparent substrate and the adherend with the adhesive.

20 Claims, 6 Drawing Sheets

METHOD FOR PRODUCING VEHICULAR STRUCTURE AND METHOD FOR PRODUCING PROTECTIVE FILM-ATTACHED TRANSPARENT SUBSTRATE

CROSS-REFERENCE TO RELATED APPLICATION

The present application is based on and claims priority under 35 U.S.C. § 119 of Japanese Patent Application No. 2019-011231, filed Jan. 25, 2019, the entire content of which is incorporated herein by reference in its entirety.

BACKGROUND OF THE INVENTION

1. Field of the Invention

The present invention relates to a method for producing a vehicular structure and a method for producing a protective film-attached transparent substrate.

2. Description of the Related Art

As a vehicular structure, a structure in which a transparent substrate and an adherend are bonded together by an adhesive is known. Examples of such structure include a structure in which a window of a vehicle is bonded to a vehicle body and a structure in which a bracket for mounting a vehicle device (such as a vehicle camera and the like) are bonded to a vehicle-inner surface of a window.

In order to produce such a vehicular structure, after a step for producing a transparent substrate such as a glass substrate (substrate production step), a step of attaching and bonding the transparent substrate to an adherend (attachment step) is performed. Although both of the above steps may be performed continuously on a single production line, a produced transparent substrate may be transported to another processing location to be attached. In the latter case, there may be a difference in time between these two steps.

Immediately after the substrate production step is finished, the cleanliness of the substrate surface is high. However, when the transparent substrate is left for a long period of time until the attachment step is performed, even if the transparent substrate is packaged, dust, dirt, or the like in the air attach to the substrate surface to reduce the cleanliness on the surface. For this reason, before attachment (adhesion) of the adherend, pretreatment for cleaning such as degreasing and washing is usually applied to at least an adhesion surface, to which an adhesive is provided, of a transparent substrate. Conventionally, various studies and improvements have been performed for such pretreatment (for example, Japanese Laid-Open Patent Publication No. 2006-192392).

SUMMARY OF THE INVENTION

However, the transparent substrate pretreatment described in Japanese Laid-Open Patent Publication No. 2006-192392 is complicated and expensive. Therefore, it is desired to achieve a method for producing a vehicular structure obtained by bonding a transparent substrate and an adherend, wherein pretreatment of the transparent substrate before attachment to the adherend can be omitted or reduced, and wherein the method can be performed simply at a low cost.

In view of the above issues, it is an adherend of an aspect of the present invention to provide a method for producing a vehicular structure including bonding, by an adhesive, a transparent substrate and an adherend, wherein the method can be performed simply at a low cost.

In order to solve the above problems, according to an aspect of the present invention, a method for producing a vehicular structure in which a transparent substrate and an adherend are bonded together by an adhesive includes pasting a protective film on, so as to cover, an adhesive arrangement area in a peripheral part of a vehicle-inner-side surface of the transparent substrate, and arranging an adhesive in the adhesive arrangement area after removing the protective film, and bonding together the transparent substrate and the adherend with the adhesive.

According to an aspect of the present invention, a method for producing a vehicular structure including bonding, by an adhesive, a transparent substrate and an adherend can be performed simply at a low cost.

BRIEF DESCRIPTION OF THE DRAWINGS

Other objects and further features of an embodiment will become apparent from the following detailed description when read in conjunction with the accompanying drawings, in which.

DETAILED DESCRIPTION OF THE PREFERRED EMBODIMENTS

Figure 1A:
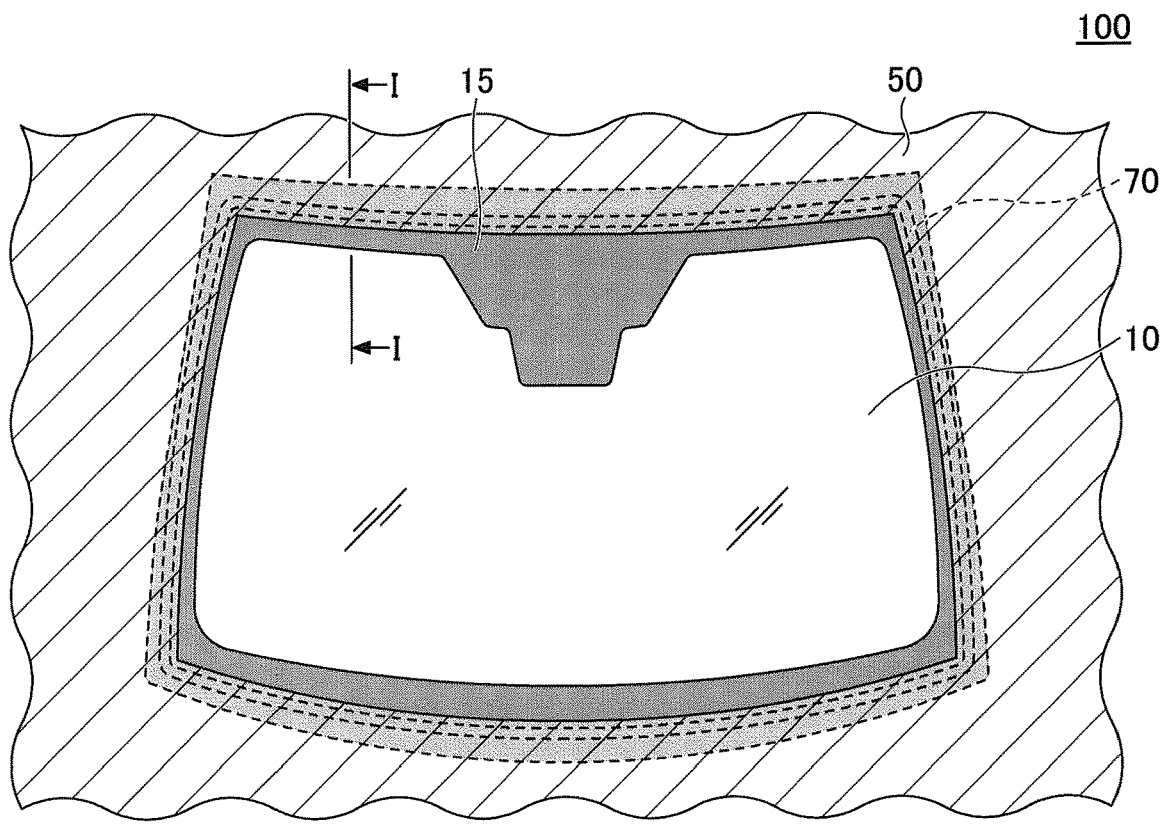
FIG. 1A is a plan view illustrating a vehicular structure according to an embodiment of the present invention.

Hereinafter, an embodiment for carrying out the present invention will be described in detail with reference to the accompanying drawings. However, the present invention is not limited to the embodiment described in the present specification. In the accompanying drawings, the same or corresponding elements may be denoted by the same or corresponding reference numerals and description thereof may be omitted.

[Vehicular Structure]

Figure 1B:
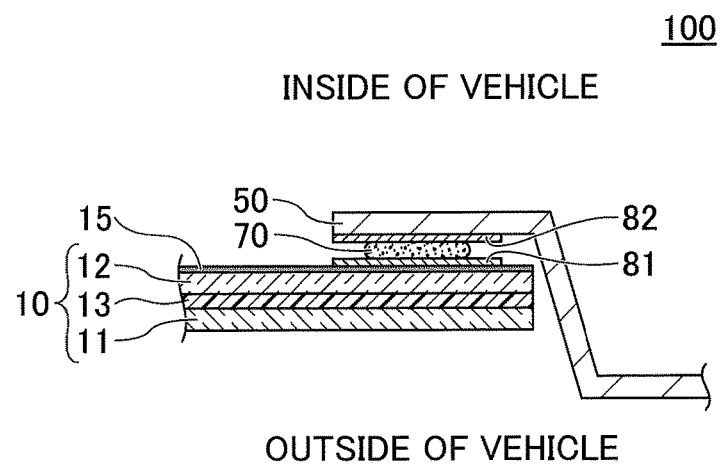
FIG. 1B is a cross sectional view taken along line I-I of FIG. 1A.

First, a vehicular structure produced according to an embodiment of the present invention will be explained. FIG. 1A and FIG. 1B schematically illustrate, as an example of a vehicular structure, a structure obtained by bonding a transparent substrate, i.e., a windshield of an automobile, and an adherend, i.e., a vehicle body. FIG. 1A is a plan view illustrating a windshield as seen from a vehicle inner side. FIG. 1B is a cross sectional view taken along line I-I of FIG. 1A.

In a vehicular structure 100 illustrated in FIG. 1A and FIG. 1B, a vehicle body (i.e., an adherend) 50 having an aperture smaller than a size of a windshield (i.e., a transparent substrate) 10 is bonded to a vehicle-inner-side surface of the windshield 10 by an adhesive 70. In the example of FIG. 1A, the vehicle body 50 is continuously bonded to an entire peripheral part of a vehicle-inner-side surface of the windshield 10. As illustrated in FIG. 1B, a vehicle-inner-side surface (i.e., a surface facing the transparent substrate) of the vehicle body 50 is bonded to the transparent substrate 10 by the adhesive (body sealant) 70. It should be noted that, dedicated primers 81, 82 may be applied between the transparent substrate 10 and the adhesive 70 and between the vehicle body 50 and the adhesive 70, respectively, as illustrated in FIG. 1B.

In this example, a laminated glass in which an interlayer 13 is interposed between a first glass plate 11 disposed at a vehicle outer side and a second glass plate 12 disposed at a vehicle inner side is used as the transparent substrate 10. Alternatively, a single-plate glass that is not a laminated glass may be used as the transparent substrate 10. The transparent substrate 10 is not limited to a windshield, and may be a glass plate for an automobile-use window such as rear glass, side glass, roof glass, and the like. Alternatively, the transparent substrate 10 may be those used for vehicles other than automobiles, for example, those used for trains and the like.

The above-described glass plate may be made from a glass plate such as soda lime silicate glass, aluminosilicate glass, borate glass, lithium aluminosilicate glass, borosilicate glass, and the like. The glass plate may be non-tempered, or may be treated with heat tempering or chemical tempering treatment. Non-tempered glass is obtained by forming molten glass into a plate and slowly cooling it. The tempered glass is glass in which a compressive stress layer is formed on a surface of non-tempered glass. When the tempered glass is heat tempered glass, the glass surface may be tempered by rapidly cooling a uniformly heated glass plate heated to a temperature at a softening point and causing compressive stress on the glass surface by a temperature difference between the glass surface and the inside of the glass. When the tempered glass is chemically tempered glass, the glass surface may be tempered by causing a compressive stress on the glass surface by an ion exchange method or the like. Also, a glass plate that absorbs ultraviolet rays or infrared rays may be used for a glass plate for a vehicle. Further, a glass plate for a vehicle is preferably transparent, but may be colored glass that is colored to such an extent that the transparency is not impaired. Organic glass may be used for a glass plate for a vehicle. Examples of organic glass include transparent resin such as polycarbonate.

The shape of the transparent substrate is not limited to a substantially rectangular shape as illustrated in FIG. 1A, and the transparent substrate 10 may be processed to have various shapes.

In a case where the transparent substrate is a glass plate for a vehicle, the method for forming the glass plate is not particularly limited. For example, the transparent substrate is preferably glass formed by float method and the like. In that case, the transparent substrate, which is a glass plate for a vehicle, may be curved so as to protrude toward the vehicle outer side when the transparent substrate is used on the vehicle. More specifically, the transparent substrate may be a substrate curved in at least two directions, for example, may be a substrate curved in whichever cross section of a cross section taken in one direction and a cross section taken in another direction perpendicular to the one direction the transparent substrate is seen. The curve of the transparent substrate may be formed by bending processing, and examples of methods of bending processing include gravity formation, press formation, and the like.

A plate thickness of the transparent substrate 10 is preferably 0.4 mm or more and 3.0 mm or less, more preferably 1.0 mm or more and 2.5 mm or less, still more preferably 1.5 mm or more and 2.3 mm or less, and particularly preferably 1.7 mm or more and 2.0 mm or less. In a case where the transparent substrate 10 is a laminated glass including a first glass plate 11 disposed at a vehicle outer side and a second glass plate 12 disposed at a vehicle inner side, the plate thickness of each of the first glass plate 11 and the second glass plate 12 is preferably 0.4 mm or more and 3.0 mm or less, more preferably 1.0 mm or more and 2.5 mm or less, still more preferably 1.5 mm or more and 2.3 mm or less, and particularly preferably 1.7 mm or more and 2.0 mm or less. The plate thicknesses of the first glass plate 11 and the second glass plate 12 may be the same as each other, or may be different from each other. In a case where the plate thicknesses of the first glass plate 11 and the second glass plate 12 are different from each other, the plate thickness of the second glass plate 12 is preferably thinner. In a case where the plate thickness of the second glass plate 12 is thinner, the weight of the transparent substrate 10 can be sufficiently reduced when the plate thickness of the second glass plate 12 is 0.4 mm or more and 1.3 mm or less. In a case where the transparent substrate 10 is attached to an aperture of a vehicle, any one of or both of the first glass plate 11 and the second glass plate 12 may be in a wedge shape in which the plate thickness increases away from a lower side toward an upper side.

In a case where the transparent substrate 10 is a glass substrate as in this example, a plurality of the above-described glass plates may be used, and an interlayer may be disposed between the glass plates, and the transparent substrate 10 can be formed by at least one of pressurizing and heating. As the interlayer, a film containing ethylene vinyl acetal, polyvinyl butyral, or the like as a main component can be used.

In a case where the transparent substrate is window glass as in this example, a light shielding film 15 which is generally referred to as black ceramic may be provided along the peripheral part of the vehicle-inner-side surface (FIG. 1A). In a case where the transparent substrate 10 is laminated glass, the light shielding film 15 may be provided on at least one of or both of a vehicle-inner-side surface of the first glass plate located at the vehicle outer side and a vehicle-inner-side surface of the second glass plate located at the vehicle inner side. For example, as illustrated in FIG. 1B, the light shielding film 15 is provided on the vehicle-inner-side surface of the second glass plate 12 located at the vehicle inner side. The thickness of the light shielding film 15 is preferably 3 μm or more and 15 μm or less. The range in which the light shielding film 15 is provided is not particularly limited, but the light shielding film 15 is preferably provided in a range extending from a position 20 mm or more away from the edge portion of the transparent substrate to a position 300 mm or less away from the edge portion.

The light shielding film forms a black or dark opaque layer, and has a function to protect a member made of an organic material such as sealant disposed between the window glass and the body from deterioration caused by ultraviolet rays or the like. In addition, the light shielding film hides parts such as antenna wire terminals attached to the peripheral part of the window glass from the outside of the vehicle to improve aesthetics. The light shielding film can be formed by applying a ceramic color paste containing a meltable glass frit containing black pigment and firing it, but the light shielding film is not limited thereto. The light shielding film may be formed by applying an organic ink containing black or dark pigment and drying it.

In FIG. 1A, the adherend is a vehicle body 50, but the adherend is not limited to what is illustrated in FIG. 1A. The adherend according to this embodiment may be a part such as a pin disposed between window glass for a vehicle and a vehicle body, or may be a soundproof molding, an exterior molding, or the like.

As described later, the adherend may be a mirror base for a rearview mirror (inner mirror) attached to a vehicle-inner-side surface of window glass or a bracket for a vehicle device. Examples of vehicle devices include at least one of vehicle sensors such as a camera, a raindrop sensor, a defrost sensor, a temperature sensor, a humidity sensor, and a millimeter wave sensor, antennas such as an ETCS (electronic toll collection system) antenna and radio and terrestrial digital TV antennas, and communication devices such as, e.g., an intercommunication radio module, a radio receiver amplifier, and the like. Therefore, the adherend may be a bracket for a vehicle device such as a bracket for a vehicle camera, a bracket for a vehicle sensor, and the like, or may be a mirror base (mirror button), and the like.

Such an adherend may be made of metal or resin, i.e., may be composed of metal or resin, or a combination thereof. Examples of metals that can constitute the adherend include zinc, aluminum, and alloys thereof, stainless steel (including sintered SUS), and the like. Examples of resins constituting the adherend include polyesters such as polyethylene terephthalate (PET) and polybutylene terephthalate (PBT), polyolefins such as polyethylene (PE) and polypropylene (PP), polycarbonate (PC), polyamide (PA) such as nylon 6, nylon 6, 6, and the like, high temperature polyamide (PA6T/PA6I), polyimide (PI), polyetherimide (PEI), acrylonitrile-butadiene-styrene (ABS), polyacetal (POM), polyvinyl chloride (PVC), and the like, either including a filler or not including a filler. The above materials may be used alone, or one or more of the above materials may be used in combination.

The adhesive to be used is not particularly limited as long as it can relatively fix the position of the transparent substrate and the adherend by a phenomenon referred to as adhesion or pressure-sensitive adhesion. The adhesive (including those referred to as pressure-sensitive adhesive) may be in such a form that the adhesive has fluidity during application, and can be disposed by being applied to a principle face of the transparent substrate or the adherend. Further, the adhesive may be in such a form in which a layer of adhesive is formed on one surface or both surfaces of a tape-shaped base material (i.e., tape type adhesive), so that the adhesive together with the base material can be applied to a desired position.

The type of adhesive component to be used can be selected according to at least one of the material of the transparent substrate and the material of the adherend, and may be at least one of urethane, modified silicone, acrylic, epoxy, and polyvinyl alcohol. Also, as the adhesive, a hot melt adhesive containing a thermoplastic elastomer, rubber or the like can be used.

When the adhesive is a tape type adhesive, for example, an acrylic foam tape based on acrylic foam can be used. The acrylic foam tape may be such that a pressure-sensitive type adhesive layer, a thermosetting type adhesive layer, and a heat fusion type adhesive layer is formed on one surface or both surfaces of a tape base material.

[Flow for Producing Vehicular Structure]

Figure 2:
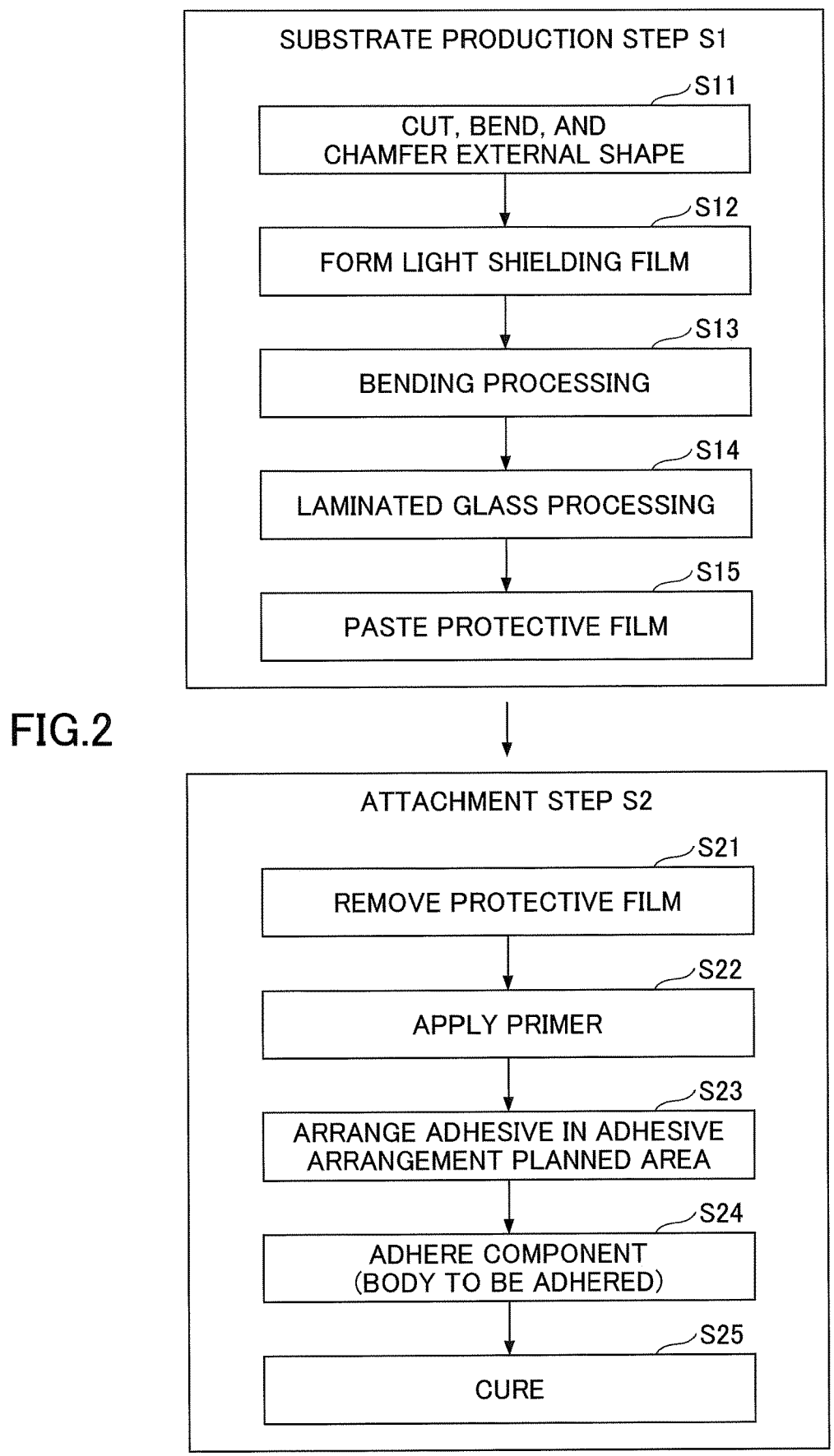
FIG. 2 is a flowchart illustrating a method according to an embodiment of the present invention.

Subsequently, overview of a flow for producing a vehicular structure according to the present embodiment will be explained. FIG. 2 schematically illustrates an example of a production flow. A flow for producing a vehicle structure according to this example roughly includes a substrate production step S1 for producing a transparent substrate for a vehicle and an attachment step S2 for attaching, to the adherend, a transparent substrate for a vehicle produced in the substrate production step. As described below, the attachment step S2 is a step for bonding the transparent substrate to the adherend using the adhesive.

(Substrate Production Step S1)

As illustrated in FIG. 2, in the substrate production step S1, first, an obtained unprocessed plate of a transparent substrate for a vehicle is cut or bent to have a desired external shape, and further, a chamfering processing and the like is applied (S11). Thereafter, a light shielding film capable of shielding transmission of light is printed and sintered at a predetermined position (S12). Thereafter, the transparent substrate is processed to have a curve by a gravity method or a press method. The gravity method includes placing the transparent substrate on a ring mold, and heating and softening the transparent substrate to bend the transparent substrate into a shape along the ring mold by gravity. The press method includes pressurizing the transparent substrate sandwiched between a ring mold and a press mold to bend the transparent substrate.

In a case where the transparent substrate is a laminated glass, the laminated glass processing (S14) can be continued by using a plurality of glass plates obtained from the above steps. In the laminated glass processing (S14), for example, an interlayer is arranged between two or more bent-processed glass plates, and a laminate constituted by the two or more glass plates and the interlayer is placed in a rubber vacuum bag. The laminate is pre-bonded at a temperature of 70 to 110 degrees Celsius while the rubber vacuum bag is evacuated (degassed) to attain a pressure reduction of about −65 kPa to −100 kPa from the atmospheric pressure (i.e., attain an absolute pressure of about 36 kPa to 1 kPa) in the rubber vacuum bag. This pre-bonded laminate is placed in an autoclave, and heated and pressurized to be bonded under a condition at a temperature of about 120 to 150 degrees Celsius with a pressure of about 0.98 to 1.47 MPa. As a result, a laminated glass is obtained.

In the substrate production step S1 according to the present embodiment, after, preferably immediately after, the above bending processing (S13) or the laminated glass processing (S14), a protective film is pasted so as to cover an adhesive arrangement area at a peripheral part of a vehicle-inner-side surface of the transparent substrate (S15). The pasting of this protective film (S15), and the adhesive arrangement area will be explained later in detail.

Before and after each step in the substrate production step S1, as necessary, processing for cleaning such as washing and degreasing may be applied to an unprocessed plate or substrate. Before a protective film is pasted (S15), a long-life primer suitable for an adhesive to be used (for example, a primer with a pot life of eight hours or more) can be applied to the transparent substrate in the clean state.

(Attachment Step S2)

After the substrate production step S1, an attachment step S2 for bonding the transparent substrate and the adherend follows. As described above, the attachment step S2 may be performed at the same processing location as the location where the substrate production step S1 is performed, or at a processing location different from the location where the substrate production step S1 is performed.

In the attachment step S2, first, the protective film that is pasted in the last stage of the above-described substrate production step S1 is removed (S21) to expose the adhesive arrangement area. In the adhesive arrangement area, a primer suitable for the material of the transparent substrate and the type of the adhesive can be applied as required (S22). In a case where the long-life primer is applied in the substrate production step S1, or depending on the type of the adhesive used in a subsequent step, the application of the primer (S22) in the attachment step S2 can be omitted.

After the primer is applied (S22), the adhesive is arranged (S23). As described above, the adhesive may be an adhesive that can be arranged by application, or may be a tape-type adhesive. Thereafter, the adherend is aligned and attached (S24). At this occasion, depending on cases, at least one of pressure and heat may be applied to the transparent substrate and the adherend. Thereafter, as necessary, the adhesive may be cured to attain a desired adhesive strength (S25).

[Pasting of Protective Film (S15)]

As described above, in the substrate production step S1, the protective film can be pasted to cover at least the adhesive arrangement area at the peripheral part of the vehicle-inner-side surface of the transparent substrate (S15).

(Adhesive Arrangement Area)

The adhesive arrangement area means an area where the adhesive is arranged when the transparent substrate and the adherend are bonded together in the attachment step S2. In a case where the adhesive is squashed to spread in the surface direction when, e.g., the transparent substrate and the adherend are pressed after the adhesive and the adherend are arranged, the adhesive arrangement area may mean an area that is occupied by the adhesive after the adhesive spreads. The adhesive arrangement area may overlap an area where the adherend is bonded (which may also be referred to as an adhesion region of the adherend, i.e., an area of the transparent substrate occupied by the adhesion surface of the adherend after the transparent substrate and the adherend are bonded together). In other words, the adhesive arrangement area may be included in the adhesion region of the adherend, or may be substantially equal to the adhesion region of the adherend.

Figure 3A:
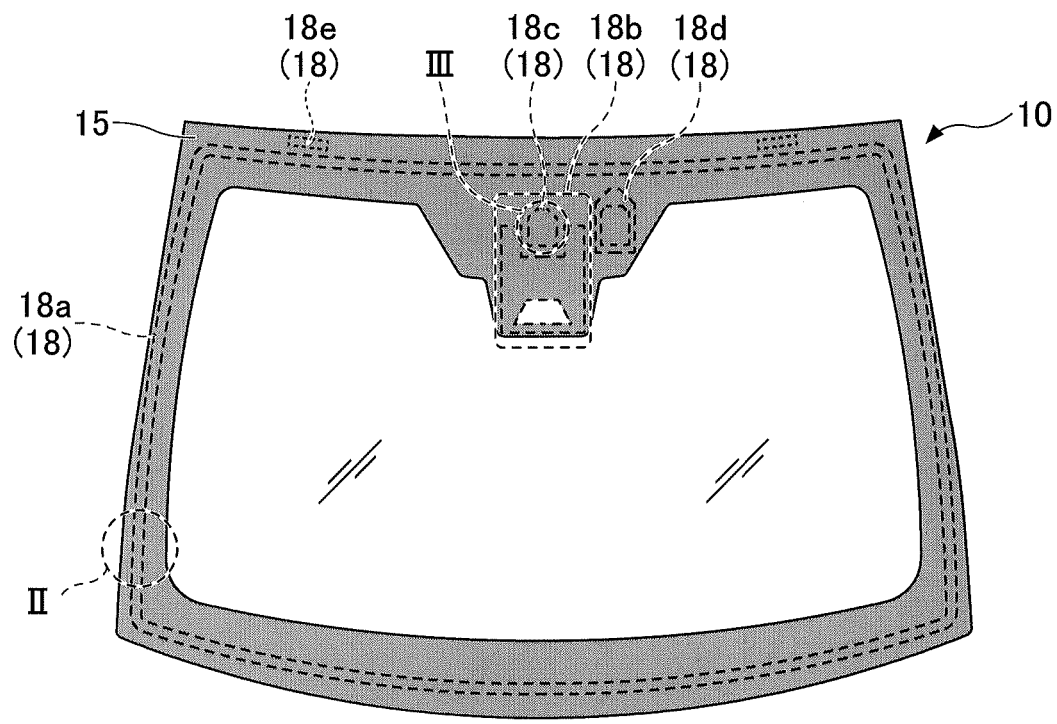
FIG. 3A is a plan view illustrating a transparent substrate according to an embodiment of the present invention.

Here, the adhesive arrangement area and the adhesion region of the adherend will be explained in more detail. FIG. 3A illustrates the transparent substrate 10 having been processed in the bending processing (S13) or the laminated glass processing (S14) using a windshield of an automobile as an example in a manner similar to FIG. 1A. FIG. 3A is a plan view illustrating a windshield (transparent substrate) 10 as seen from the vehicle inner side.

As illustrated in FIG. 3A, the adhesion region of the adherend 18 is located at the peripheral part of the vehicle-inner-side surface of the transparent substrate 10. As illustrated in FIG. 3A, the adhesion region of the adherend 18 may include adhesion areas of the adherends 18a to 18e corresponding to a plurality of different bodies.

The adhesion region of the adherend 18a as illustrated in FIG. 3A is an area of a surface of the transparent substrate 10, to which the vehicle body (denoted by reference numeral 50 in FIG. 1A and FIG. 1B), which is an adherend, is bonded. As illustrated in FIG. 3A, the adhesion region of the adherend 18a for the vehicle body is formed along the peripheral part of the transparent substrate 10. In the example illustrated in FIG. 3A, the adhesion region of the adherend 18a is formed continuously throughout the entire peripheral part. This is because, in a case where the transparent substrate is a windshield, the adhesive is arranged continuously throughout the entire peripheral part of the transparent substrate 10 in order to enhance water tightness and preventing sound leakage. However, depending on the configuration and purpose of a vehicular structure to be produced, the adhesion region of the adherend 18a formed along the peripheral part may be discontinuous.

Figure 3B:
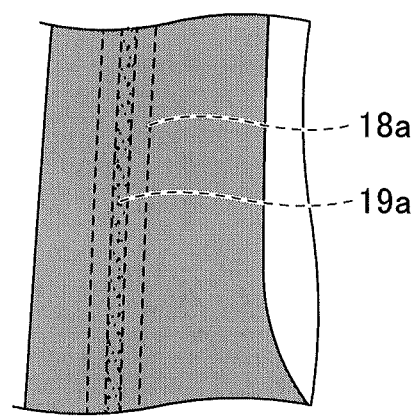
FIG. 3B is an enlarged view illustrating a portion II of FIG. 3A.

FIG. 3B is an enlarged view illustrating a portion II including the adhesion region of the adherend 18a of FIG. 3A. FIG. 3B illustrates the adhesion region of the adherend 18a and the adhesive arrangement area 19a corresponding to the adhesion region of the adherend 18a. In the example illustrated in FIG. 3B, the adhesive arrangement area 19a is included in the adhesion region of the adherend 18a, but the adhesive arrangement area 19a and the adhesion region of the adherend 18a can be substantially the same area.

Like the adhesion region of the adherend 18a, the adhesive arrangement area 19a may be continuous throughout the entire peripheral part of the transparent substrate 10. Regardless of whether the adhesion region of the adherend 18a is continuous or not, the adhesive arrangement area 19a may extend intermittently, instead of being continuous along the entire peripheral part, depending on the type of the adhesive, the material of the adherend (the vehicle body), and the like. In other words, when the transparent substrate and the adherend are bonded together, the adhesive may be arranged intermittently.

FIG. 3A further illustrates adhesion areas of the adherends 18b, 18c, and 18d in a case where the adherend is a bracket for a sensor such as a bracket for a vehicle camera, a mirror base, a raindrop sensor, and the like. As illustrated in FIG. 3A, the adhesion areas of the adherends 18b, 18c, and 18d are located in the peripheral part of the transparent substrate 10. The transparent substrate 10 includes adhesive arrangement areas corresponding to the respective adhesion areas of the adherends 18b, 18c, and 18d.

Figure 3C:
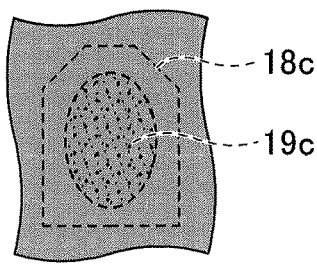
FIG. 3C is an enlarged view illustrating a portion III of FIG. 3A.

FIG. 3C is an enlarged view illustrating a portion III including the adhesion region of the adherend 18c of FIG. 3A. FIG. 3C illustrates the adhesion region of the adherend 18c and the adhesive arrangement area 19c corresponding to this area. In the example of FIG. 3C, the adhesive arrangement area 19c is included in the adhesion region of the adherend 18c, but the adhesive arrangement area 19c may be an area substantially equal to the adhesion region of the adherend 18c.

The adhesion region of the adherend 18e illustrated in FIG. 3A is an area to which a pin, i.e., an adherend, is bonded. In a manner similar to other adhesion areas of the adherend, the transparent substrate 10 may include an adhesive arrangement area included in the adhesion region of the adherend 18e and corresponding to the adhesion region of the adherend 18e.

In this example, the adhesion areas of the adherends 18a to 18e and the adhesive arrangement areas corresponding to the respective adhesion areas of the adherends 18a to 18e are located in the peripheral part of the transparent substrate. This is preferable from the perspective of ensuring the visibility of occupants in a case where the transparent substrate is a window glass plate.

The adhesion areas of the adherends 18a to 18e and the adhesive arrangement areas are preferably included, as viewed in the thickness direction of the transparent substrate 10, in an area where the light shielding film 15 is provided. As described above, the light shielding film 15 is formed on the vehicle-inner-side surface of the transparent substrate 10, formed inside of the transparent substrate 10, or formed on both of the vehicle-inner-side surface of the transparent substrate 10 and inside of the transparent substrate 10. In a case where the transparent substrate 10 is a laminated glass, the light shielding film 15 is formed on a vehicle-inner-side surface of a glass plate at a vehicle inner side, formed on a vehicle-inner-side surface of a glass plate at a vehicle outer side, or formed on both of the vehicle-inner-side surface of the glass plate at the vehicle inner side and the vehicle-inner-side surface of the glass plate at the vehicle outer side. Therefore, in a case where the transparent substrate 10 is seen from the vehicle outer side, the adhesion areas of the adherends 18a to 18e and the adhesive arrangement areas are preferably disposed at positions that are shielded by the light shielding film 15 and cannot be seen.

The adhesion region of the adherend and adhesive arrangement area illustrated in the drawings are only examples. Depending on the configuration and purpose of a transparent substrate and an adherend constituting a vehicular structure, the adhesion region of the adherend and the adhesive arrangement area may be in various ranges, may be of various sizes, and may have various contour shapes. For example, as illustrated in drawings, an adhesion region of the adherend and an adhesive arrangement area corresponding to the adhesion region of the adherend may be at a position away from an edge portion of the transparent substrate by a predetermined distance, or may be provided in contact with the edge portion of the transparent substrate. The adherends illustrated in the drawings are merely examples, and the adherends may be any bodies such as a molding, and electric connection members attached to the vehicle-inner-side surface.

The transparent substrate 10 may include one or more adhesion areas of the adherends 18a to 18e explained above, and may include adhesive arrangement areas corresponding to the respective adhesion areas of the adherends 18a to 18e. In addition, the transparent substrate 10 may include an adhesion region of the adherend other than the adhesion areas of the adherends 18a to 18e illustrated in the drawing, and may include an adhesive arrangement area corresponding thereto. In other words, a vehicular structure to be produced may include an adherend other than the adherends explained with reference to FIG. 3A to FIG. 3C. In that case, an adherend can be additionally bonded to a vehicle-outer-side surface of a transparent substrate, and the transparent substrate can also have an adhesive arrangement area and an adhesion region of the adherend on the vehicle-outer-side surface. In that case, protective films can be pasted to peripheral parts of both of the vehicle-inner-side surface and the vehicle-outer-side surface of the transparent substrate.

Figure 3D:
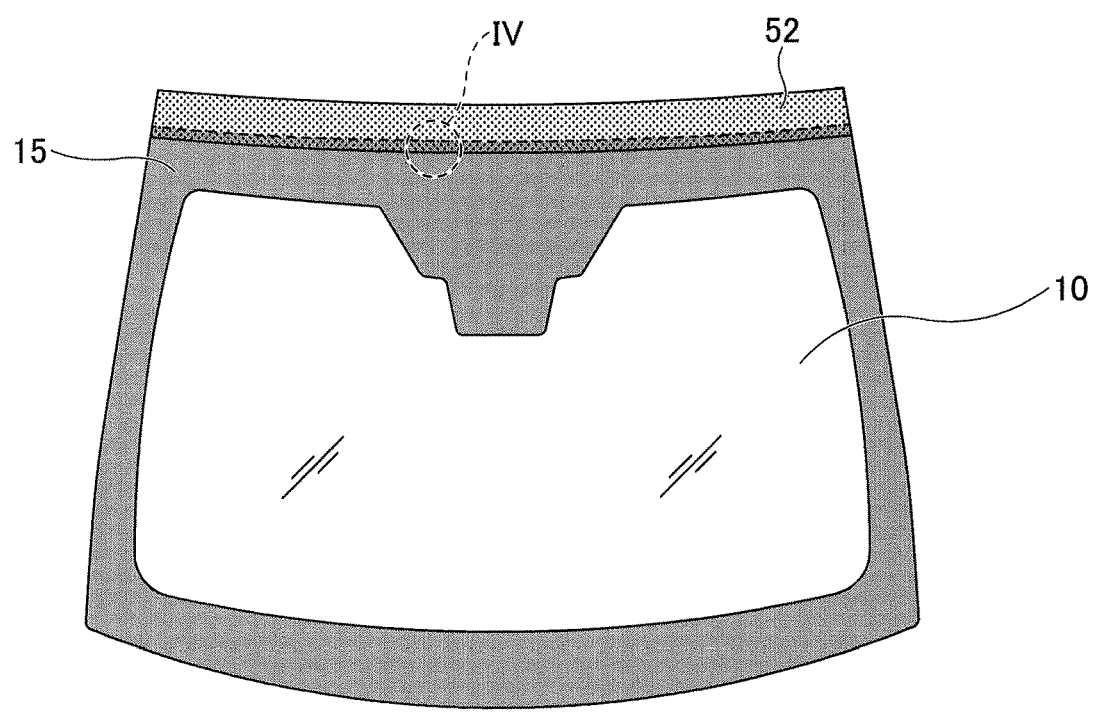
FIG. 3D is a plan view illustrating a transparent substrate according to an embodiment of the present invention.
Figure 3E:
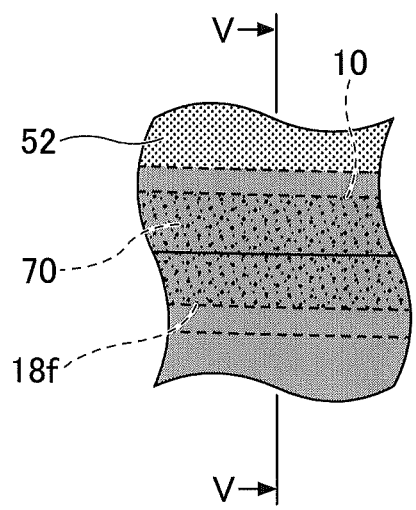
FIG. 3E is an enlarged view illustrating a portion IV of FIG. 3D.
Figure 3F:
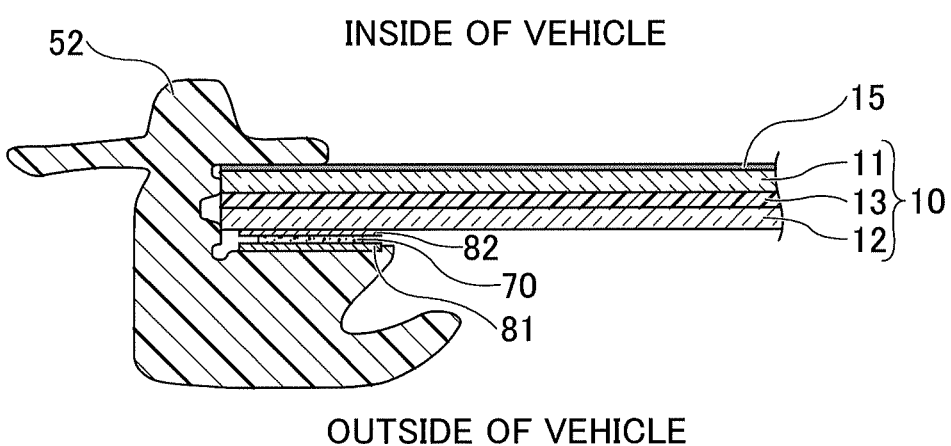
FIG. 3F is a cross sectional view taken along line V-V of FIG. 3E.

FIG. 3D illustrates an example in which a molding, serving as an adherend, is bonded to a vehicle-outer-side surface along an upper side of the transparent substrate. In the example of FIG. 3D, although the molding is provided to cover an end face of the upper side of the transparent substrate, the molding is bonded only to the vehicle-outer-side surface. FIG. 3D is a drawing illustrating a windshield arranged with the molding as seen from a vehicle inner side. In FIG. 3D, peripheral components and the like are omitted. FIG. 3E is an enlarged view illustrating a portion IV of FIG. 3D. FIG. 3F is a cross sectional view taken along line V-V of FIG. 3E.

As illustrated in FIG. 3E and FIG. 3F, a molding 52 is bonded to vehicle-outer-side surface of the transparent substrate by an adhesive 70. In this example, dedicated primers 81, 82 may be applied between the molding 52 and the adhesive 70 and between the transparent substrate 10 and the adhesive 70, respectively. In this example, a double-sided tape is used as the adhesive 70, and the area where the adhesive 70 is arranged as illustrated in FIG. 3E and FIG. 3F can be an adhesive arrangement area 18f (FIG. 3E).

Especially, in rear glass and the like, an electric or mechanical element for a defogger and the like and a connection member therefor and the like may be bonded to one or both of side portions in the peripheral part of the vehicle-outer-side surface. In this case, an adhesive arrangement area and an adhesion region of the adherend corresponding to a portion to which the member is attached can be provided on the vehicle-outer-side surface of the rear glass.

(Protective Film)

Figure 4:
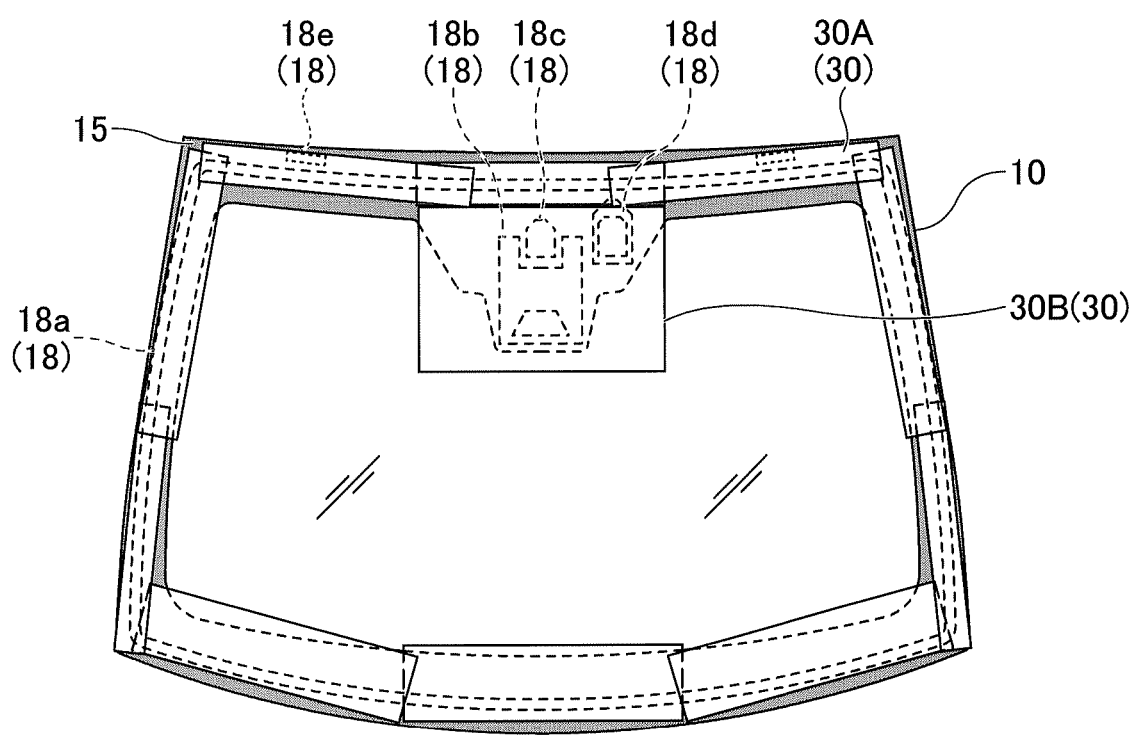
FIG. 4 is a plan view illustrating a protective film-attached transparent substrate according to an embodiment of the present invention.

FIG. 4 illustrates a drawing in a state in which a protective film 30 is bonded to the transparent substrate 10 of FIG. 3A. Like FIG. 3A, FIG. 4 is also a plan view illustrating a windshield (transparent substrate) 10 as seen from a vehicle inner side.

The protective film 30 is pasted to a vehicle-inner-side surface so as to cover an adhesive arrangement area (denoted by reference numeral 19a in FIG. 3B and reference numeral 19c in FIG. 3C) of the transparent substrate 10. As illustrated in FIG. 4, the protective film 30 is preferably bonded so as to cover the adhesion areas of the adherends 18a to 18e.

In the substrate production step S1 explained above, the protective film 30 is pasted after the processing of the substrate (i.e., after the finish of the bending processing (S13) or the laminated glass processing (S14)), and thereafter, in the attachment step S2, the protective film 30 is removed (FIG. 2) before the adhesive is arranged (S23) or, depending on cases, before the primer is applied (S22).

In a case where the substrate production step S1 and the attachment step S2 in the flow for producing the vehicular structure (FIG. 2) are performed at different processing locations, the produced transparent substrate has to be transported. Even in a case where the substrate production step S1 and the attachment step S2 are performed at the same processing locations, if there is a difference in time between these two steps, the transparent substrate has to be stored for a predetermined period of time. In such a case, although the transparent substrate can be packaged by covering the transparent substrate with a sheet, bag, and the like, the substrate surface comes into contact with air. Therefore, it is inevitable that dust and dirt in the air, and other particles and molecules that may interfere with adhesion are attached. Therefore, even if the surface of the transparent substrate is clean immediately after its production, the cleanliness gradually decreases. For this reason, in a conventional production flow, in the attachment step S2, it used to be necessary to perform cleaning processing such as degreasing and washing on at least an adhesive arrangement area of the transparent substrate before adhesive or primer is arranged.

In contrast, in the present embodiment, a protective film is pasted to the transparent substrate so as to cover the adhesive arrangement area in the substrate production step S1 (S15). Therefore, dust and dirt can be prevented from bonding to the adhesive arrangement area during storage or transport of the transparent substrate after the substrate production step S1, and cleanliness of the adhesion surface of the transparent substrate obtained immediately after the processing of the substrate is finished can be maintained. In addition, in a case where a long-life primer is applied before the protective film is pasted (S15), the state in which the long-life primer can achieve its function can be maintained.

Furthermore, in the attachment step S2, by just removing the protective film before the adherend is bonded (S21), the adhesive arrangement area having a high degree of cleanliness appears immediately. Therefore, complicated conventional processing such as degreasing and washing can be omitted or the processing can be simplified. Therefore, the method for producing the vehicular structure that can be performed simply at a low cost can be obtained.

Furthermore, in general, organic solvents are often used for pretreatment of the transparent substrate such as degreasing and washing, which may place a burden on the environment. However, according to the embodiment, the use of such organic solvents can be reduced or omitted, and therefore, the method for producing the vehicular structure with less environmental burden can be achieved.

The protective film 30 preferably includes protective films 30A pasted so as to cover at least the adhesive arrangement area (denoted by reference numeral 19a in FIG. 3B) for a vehicle body. The protective films 30A are preferably pasted so as to cover the adhesion region of the adherend 18a for the vehicle body. Therefore, the protective films 30A are preferably pasted in a loop shape (i.e., in a ring shape or a donut shape) along the peripheral part of the vehicle-inner-side surface of the transparent substrate 10. The protective films 30A may be discontinuous somewhere in the loop shape, but regardless of whether the adhesion region of the adherend 18a or the adhesive arrangement area corresponding thereto (denoted by reference numeral 19a in FIG. 3B) is continuous or not throughout the entire peripheral part, the protective films 30A are preferably pasted continuously in a loop shape along the entire peripheral part without disconnection. Accordingly, the cleanliness of the area to which the vehicle body is bonded can be maintained at a high level.

The protective film 30 may include a protective film 30B attached so as to cover an adhesive arrangement area for a bracket for a vehicle device. As illustrated in FIG. 4, the protective film 30B is pasted to a central upper portion, in terms of the orientation in FIG. 4, of the transparent substrate 10 so as to cover the adhesion areas of the adherends 18b to 18d. The protective films 30A and the protective film 30B may be separated or integrated.

As illustrated in FIG. 4, an area of the transparent substrate 10 covered by the protective film 30 is not the entire surface of the transparent substrate 10 but a portion of the principle surface of the transparent substrate 10. In this way, in the present embodiment, the protective film 30 is preferably pasted so as to avoid the central area of the transparent substrate 10, i.e., preferably not provided in the central area of the transparent substrate 10. Here, in a case where the transparent substrate 10 is a window for a vehicle, the central area of the transparent substrate 10 can be said to be, if a foreign substance is attached there, an area in which an occupant who sees outside from inside of the window would feel obstruction of visibility. For example, the central area of the transparent substrate can be said to be an area with a same or similarly located center of mass or centroid as that of the transparent substrate as viewed in a thickness direction of the transparent substrate and having a size of area that is 50% or more and 90% or less with respect to a size of area of the principle surface of the transparent substrate.

In a case where the transparent substrate 10 is a windshield, the above-described central area can be said to be a test area A according to a specification of JIS R3212 (2015), and can be said to be the test area A and a test area B according to the same specification. Therefore, for example, the protective film 30 can be bonded to an area including a test area I according to the above specification, and the area to which the protective film is pasted is preferably configured to be within the test area I.

Although a film that can be separated in the attachment step S2 (FIG. 2) is used as the protective film 30, depending on the usage conditions of the film (pasting condition, removing condition, storage condition, and the like), a part of the protective film may remain on the transparent substrate when the protective film is removed (S21). For example, the protective film could be accidentally torn off in the step of removing the protective film, and a piece of the protective film could remain, and in a case where the protective film has an adhesive, the adhesive could remain on the transparent substrate (which may also be referred to as an adhesive residue). In a case where the transparent substrate is a window for a vehicle, and if a portion of such protective film remains, the visibility of the occupant may be obstructed. For this problem, by pasting the protective film 30 in such a manner as to avoid the central area of the transparent substrate 10, it is possible to produce a structure including a window for a vehicle and an adherend that does not obstruct the visibility of an occupant even in a case where a part of the protective film remains.

Therefore, according to a configuration in which the protective film 30 is not pasted to the central area of the transparent substrate 10, it is less likely to restrict a range of selection of protective films as a result of excessively considering adhesive residue and the like of the protective film 30. Furthermore, since the protective film 30 is not pasted to the central area of the transparent substrate 10, the amount of the pasted protective film 30 can be reduced, and accordingly the cost can be reduced, and in addition, a work of pasting a large-sized protective film 30 can be eliminated.

In a case where the light shielding film 15 is formed on the transparent substrate 10, as illustrated in FIG. 4, the protective film 30 can be pasted so as to overlap, as viewed in the thickness direction of the transparent substrate 10, an area where the light shielding film 15 is formed. The protective film 30 can be pasted so as to include, as viewed in the thickness direction of the transparent substrate 10, the area where the light shielding film 15 is formed, or may be pasted so as to be included by, as viewed in the thickness direction of the transparent substrate 10, the area where the light shielding film 15 is famed.

In the example of FIG. 4, the entire protective film 30 (30A and 30B) is provided on the vehicle-inner-side surface of the transparent substrate 10, but in a case where, as described above, there is an adherend that can be additionally bonded to a vehicle-outer-side surface (e.g., an exterior molding), the adhesive arrangement area and the adhesion region of the adherend are present on the vehicle-outer-side surface, and accordingly, the protective film can be pasted to the vehicle-outer-side surface.

In the present embodiment, the protective film 30 may include a plurality of films, which may be arranged side by side on the transparent substrate 10 so as to cover a single adhesive arrangement area or adhesion region of the adherend. In that case, a plurality of films may be arranged to be in contact with each other at a border therebetween, or a plurality of films may overlap each other. In the example in FIG. 4, a plurality of protective films 30A cover the adhesion region of the adherend 18a for the vehicle body and the adhesive arrangement area 19a corresponding to the adhesion region of the adherend 18a (FIG. 3B), and the end portions of the protective films 30A overlap each other. Alternatively, a single protective film in a loop shape may cover the adhesion region of the adherend 18a and the adhesive arrangement area 19a. In the example in FIG. 4, a single protective film 30B for brackets for vehicle devices covers a plurality of adhesive arrangement areas or adhesion areas of the adherend. Alternatively, a plurality of protective films may cover respective adhesive arrangement areas or adhesion areas of the adherend.

The protective film 30 may be constituted by a single film, and a breakable weak part such as perforations may be formed, so that when the protective film is removed (S21), the protective film 30 is split at the weak part to be divided into a plurality of films and removed. For example, the protective film 30 may be a single film in which the protective films 30A and 30B illustrated in FIG. 4 are continuous, and a weak part may be formed to allow the protective film 30A and the protective film 30B to be divided.

In this manner, when the protective film 30 is configured as a plurality of films or is configured to be divided into a plurality of films during removal with a weak part and the like, the size of each film during at least one of pasting and removal can be reduced. This enables easily adjusting the protective film 30 during pasting work, and makes accidental tearing of films less likely to occur even during removal work. In addition, the sizes and the shapes of a plurality of films can be easily changed according to the position to which the film is pasted. Therefore, even when the adhesive arrangement area or the adhesion region of the adherend is in a complicated shape, the film can be formed easily, and in addition, the cost can be reduced by reducing the amount of material of the protective film.

Furthermore, in a case where the transparent substrate 10 is bent, and a large-sized protective film is pasted thereto, the film may wrinkle. In contrast, when the protective film 30 is configured as a plurality of films, the protective film 30 can be applied to the transparent substrate 10 without wrinkles, and the airtightness and watertightness at the pasting position can be improved. The radius of curvature on the vehicle-inner-side surface of the transparent substrate 10 may be R500 or more and R10000 or less at the position where the protective film 30 can be pasted. The unit of the radius of curvature is millimeters.

In a case where separate films are pasted to respective bodies just like the protective films 30A and 30B according to the present embodiment, removal of the protective film (S21), arrangement of the adhesive (S23), and adhesion of an adherend (24) can be performed for each adherend in the attachment step S2 (FIG. 2). Accordingly, even in a case where two or more bodies are bonded together, a length of time in which an adhesive arrangement area or an adhesion region of the adherend to be bonded later is exposed to the air can be reduced to enable maintaining the cleanliness in that area. This is also applicable to a case where the protective films 30A and 30B are integrally formed and a weak part is formed therebetween to enable splitting.

In the pasting of the protective film (S15) in the substrate production step S1 (FIG. 2), the protective film 30 is preferably pasted so as to be in close contact with the principle surface of the transparent substrate 10. Here, a term "to be in close contact with" means not allowing or not appreciably allowing air and water (including steam) to enter between the protective film and the principle surface of the transparent substrate (in some cases, the light shielding film). For this reason, the pasting of the protective film 30 to the transparent substrate 10 (S15) may be performed under a decompressed environment. For example, the protective film 30 can be pasted using a squeegee (rubber spatula) and the like in a reduced pressure. The film and the transparent substrate can be brought into close contact with each other by placing the film-attached transparent substrate under a reduced pressure in a rubber vacuum bag and the like. The close contact in the reduced pressure may be achieved by using an apparatus used in the above-described laminated glass processing (S14).

The material of the protective film 30 is not particularly limited, and may be a material that has airtightness and watertightness and that can be easily removed from the surface of the transparent substrate 10 during removal (S21), i.e., a material that can be sufficiently removed by hand of a person without requiring special chemical agents, tools, large force, or the like. For example, the protective film 30 may be made of polyolefin or the like as a base material and provided with an adhesive layer such as urethane adhesive, acrylic adhesive, or the like on at least one surface.

Further, the protective film 30 may not have an adhesive layer or an adhesive surface. In that case, the protective film can be attached by interposing a liquid such as water or a volatile solvent substantially free of impurities or by using static electricity.

Further, the protective film 30 may be formed by applying a fluid composition (including solution, suspension, emulsion, and the like) that is a film precursor to a predetermined area of a transparent substrate and thereafter curing the composition. That is, in this specification, the pasting of the protective film includes forming a film by applying a film precursor.

The thickness of the protective film 30 may be 50 μm or more and 300 μm or less.

The protective film 30 may be transparent or opaque. The protective film 30 may be colorless or colored. If the protective film 30 is opaque or colored, the position of the protective film 30 can be known at a glance, so that the protective film 30 can be easily removed (S21). Even if only an end portion of the protective film 30 is opaque or colored, similar effects can be obtained.

Also, an embodiment of the present invention may be a method for producing a protective film-attached transparent substrate including a transparent substrate and a protective film, the transparent substrate being bonded to an adherend by an adhesive to become a vehicular structure, the method including pasting a protective film so as to cover an adhesive arrangement area in a peripheral part of a vehicle-inner-side surface of the transparent substrate.

What is claimed is:

1. A method for producing a vehicular structure in which a transparent substrate and an adherend are bonded together by an adhesive, the method comprising:

pasting a protective film on, so as to cover, an adhesive arrangement area in a peripheral part of a vehicle-inner-side surface of the transparent substrate; and arranging an adhesive in the adhesive arrangement area after removing the protective film, and bonding together the transparent substrate and the adherend with the adhesive, wherein the protective film is pasted along the peripheral part of the transparent substrate in a loop shape while not providing the protective film in a central area of the transparent substrate.

2. The method according to claim 1, wherein the protective film includes a plurality of films, and the plurality of films are arranged side by side as viewed in a thickness direction of the transparent substrate.

3. The method according to claim 1 wherein a light shielding film is provided along the peripheral part of the vehicle-inner-side surface of the transparent substrate or a peripheral part inside of the transparent substrate, and the adhesive arrangement area is included in the light shielding film as viewed in a thickness direction of the transparent substrate.

4. The method according to claim 3, wherein the transparent substrate is a laminated glass obtained by pasting a first substrate and a second substrate, and
the light shielding film is provided on at least one of or both of the first substrate and the second substrate.

5. The method according to claim 1, wherein the transparent substrate is curved so as to protrude to a vehicle outer side.

6. The method according to claim 1, wherein the adherend is made of metal or resin.

7. The method according to claim 1, wherein the adherend is at least one of a vehicle body, a bracket for a vehicle device, a mirror base, a molding, and a pin.

8. The method according to claim 1, wherein after the transparent substrate is produced and before the transparent substrate and the adherend are bonded by the adhesive, processing for cleaning the transparent substrate is not performed.

9. A method for producing a protective film-attached transparent substrate including a transparent substrate and a protective film, the transparent substrate becoming a vehicular structure when the transparent substrate is bonded to an adherend by an adhesive, the method comprising:
pasting the protective film so as to cover an adhesive arrangement area in a peripheral part of a vehicle-inner-side surface of the transparent substrate, wherein the protective film is pasted along the peripheral part of the transparent substrate in a loop shape while not providing the protective film in a central area of the transparent substrate.

10. The method according to claim 1, further comprising removing the pasted protective film before arranging the adhesive in the adhesive arrangement area.

11. The method according to claim 10, wherein the pasted protective film is a single film having a breakable weak part, and wherein said removing comprises splitting the protective film at the weak part into a plurality of films and removing each file of said plurality.

12. The method according to claim 1, wherein the central area of the transparent substrate is an area with a same or similarly located center of mass or centroid as that of the transparent substrate as viewed in a thickness direction of the transparent substrate and having a size of area that is 50% or more and 90% or less with respect to a size of area of the principle surface of the transparent substrate.

13. The method according to claim 1, wherein the protective film is made of polyolefin as a base material and provided with an adhesive layer on at least one surface.

14. The method according to claim 13, wherein the adhesive layer comprises an urethane adhesive or an acrylic adhesive.

15. The method according to claim 1, wherein the protective film is attached by interposing a liquid or by using static electricity.

16. The method according to claim 15, wherein the liquid is water or a volatile solvent.

17. The method according to claim 1, wherein a thickness of the protective film is from 50 μm to 300 μm.

18. The method according to claim 1, wherein the protective film is transparent or colorless.

19. The method according to claim 1, wherein the protective film is opaque or colored.

20. The method according to claim 10, wherein a thickness of the protective film is from 50 μm to 300 μm.

\* \* \* \* \*